(12) United States Patent
Aqui et al.

(10) Patent No.: US 12,146,736 B2
(45) Date of Patent: Nov. 19, 2024

(54) METROLOGY SYSTEM

(71) Applicants: Derek Aqui, Wilsonville, OR (US); Mark Baker, Wilsonville, OR (US); Chris Barns, Wilsonville, OR (US); Robert Batten, Wilsonville, OR (US); Shawn Boling, Wilsonville, OR (US); Jared Greco, Wilsonville, OR (US); Garrett Headrick, Wilsonville, OR (US); Clint Vandergiessen, Wilsonville, OR (US)

(72) Inventors: Derek Aqui, Wilsonville, OR (US); Mark Baker, Wilsonville, OR (US); Chris Barns, Wilsonville, OR (US); Robert Batten, Wilsonville, OR (US); Shawn Boling, Wilsonville, OR (US); Jared Greco, Wilsonville, OR (US); Garrett Headrick, Wilsonville, OR (US); Clint Vandergiessen, Wilsonville, OR (US)

(73) Assignee: INDUSTRIAL METROLOGY SOLUTIONS LLC, Mebane, NC (US)

( * ) Notice: Subject to any disclaimer, the term of this patent is extended or adjusted under 35 U.S.C. 154(b) by 0 days.

(21) Appl. No.: 17/848,206

(22) Filed: Jun. 23, 2022

(65) Prior Publication Data
US 2022/0316851 A1    Oct. 6, 2022

Related U.S. Application Data

(62) Division of application No. 16/781,100, filed on Feb. 4, 2020, now Pat. No. 11,486,689, which is a division
(Continued)

(51) Int. Cl.
*G01B 5/00* (2006.01)
*G01B 3/1041* (2020.01)
(Continued)

(52) U.S. Cl.
CPC ......... *G01B 5/0002* (2013.01); *G01B 3/1041* (2013.01); *G01B 5/0007* (2013.01);
(Continued)

(58) Field of Classification Search
CPC .. G01B 5/0002; G01B 5/0009; G01B 11/005; G01B 3/1048; G01D 11/02
See application file for complete search history.

(56) References Cited

U.S. PATENT DOCUMENTS 10,599,521 B2    3/2020    Aqui et al.
2002/0177974 A1    11/2002    Ting et al.
(Continued)

FOREIGN PATENT DOCUMENTS

CN    101002258 B    12/2010
CN    202133842 U    2/2012
(Continued)

*Primary Examiner* — David Z Huang
(74) *Attorney, Agent, or Firm* — Corinne R. Gorski

(57) ABSTRACT

Apparatuses, systems and methods associated with a metrology system for high-speed, non-contact coordinate measurements of parts are disclosed herein. In embodiments, the metrology system includes a metrology bridge to be coupled to a measurement assembly. The measurement assembly may include a stage moveable across multiple independent axes. The bridge may include a housing, mounting members coupled to the housing, and a plurality of sensors mounted within the housing. The mounting members may rotatably couple the housing to the measurement assembly. Further, sensor elements of the plurality of sensor devices may be aligned along a length of the housing and may be directed out of the housing.

8 Claims, 13 Drawing Sheets

Related U.S. Application Data of application No. 16/289,447, filed on Feb. 28, 2019, now Pat. No. 10,598,521.

(60) Provisional application No. 62/636,739, filed on Feb. 28, 2018.

(51) Int. Cl.
  *G01B 9/08* (2006.01)
  *G01B 11/00* (2006.01)
  *G01D 11/02* (2006.01)
  *G01B 3/1048* (2020.01)

(52) U.S. Cl.
  CPC ............ *G01B 5/0009* (2013.01); *G01B 9/08* (2013.01); *G01B 11/005* (2013.01); *G01D 11/02* (2013.01); *G01B 3/1048* (2020.01)

(56) References Cited

U.S. PATENT DOCUMENTS

| | | |
|---|---|---|
| 2007/0291283 A1 | 12/2007 | Sakai |
| 2008/0037085 A1 | 2/2008 | Gabor et al. |
| 2008/0235970 A1 | 10/2008 | Crampton |
| 2008/0271332 A1 | 11/2008 | Jordil et al. |
| 2009/0292503 A1 | 11/2009 | Hon et al. |
| 2011/0083497 A1* | 4/2011 | Matsumiya .......... G01B 11/245 73/105 |
| 2012/0072170 A1 | 3/2012 | McKendrick et al. |
| 2014/0173870 A1 | 4/2014 | Otts |
| 2014/0317941 A1 | 10/2014 | Patti et al. |
| 2015/0049186 A1* | 2/2015 | Pettersson ............ G01B 11/005 348/135 |
| 2015/0285616 A1* | 10/2015 | Jordil ....................... H04N 7/18 33/503 |
| 2020/0209021 A1 | 7/2020 | Aqui et al. |

FOREIGN PATENT DOCUMENTS

| | | |
|---|---|---|
| CN | 103180686 A | 6/2013 |
| CN | 204718628 U | 10/2015 |
| CN | 105675299 B | 6/2016 |
| DE | 102015217637 A1 | 3/2017 |
| EP | 2230481 B1 | 9/2016 |
| EP | 3156750 A1 | 4/2017 |
| JP | H06273134 A | 9/1994 |
| JP | 2008-020436 A | 1/2008 |
| KR | 20110045342 A | 5/2011 |
| KR | 20120075229 A | 7/2012 |
| KR | 101302082 B1 | 9/2013 |
| WO | 2015155201 A1 | 10/2015 |
| WO | 2019169184 A1 | 9/2019 |

\* cited by examiner

METROLOGY SYSTEM

RELATED APPLICATIONS

The present application is a Divisional Application of U.S. patent application Ser. No. 16/781,100, filed Feb. 4, 2020, entitled "METROLOGY SYSTEM", which claims priority to U.S. patent application Ser. No. 16/289,447, filed Feb. 28, 2019, entitled "METROLOGY SYSTEM", now U.S. Pat. No. 10,598,521, which claims priority to U.S. Provisional Patent Application No. 62/636,739, filed Feb. 28, 2018, entitled "METHOD AND APPARATUS FOR HIGH SPEED, NON-CONTACT COORDINATE MEASURING", the entire disclosures of which are hereby incorporated by reference.

TECHNICAL FIELD

The present disclosure relates to the field of metrology. More particularly, the present disclosure relates to a metrology system, including one or more metrology bridges, for high-speed, non-contact inspection and measurement of parts.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Precision measurement of parts typically relies on contacting the parts via tools (such as sensors and probes) to perform the measurements. Each tool is typically retrieved from a storage position and moved into contact with an object to perform. The contact of the tools with the parts may further cause damage to or induce defects within the object.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
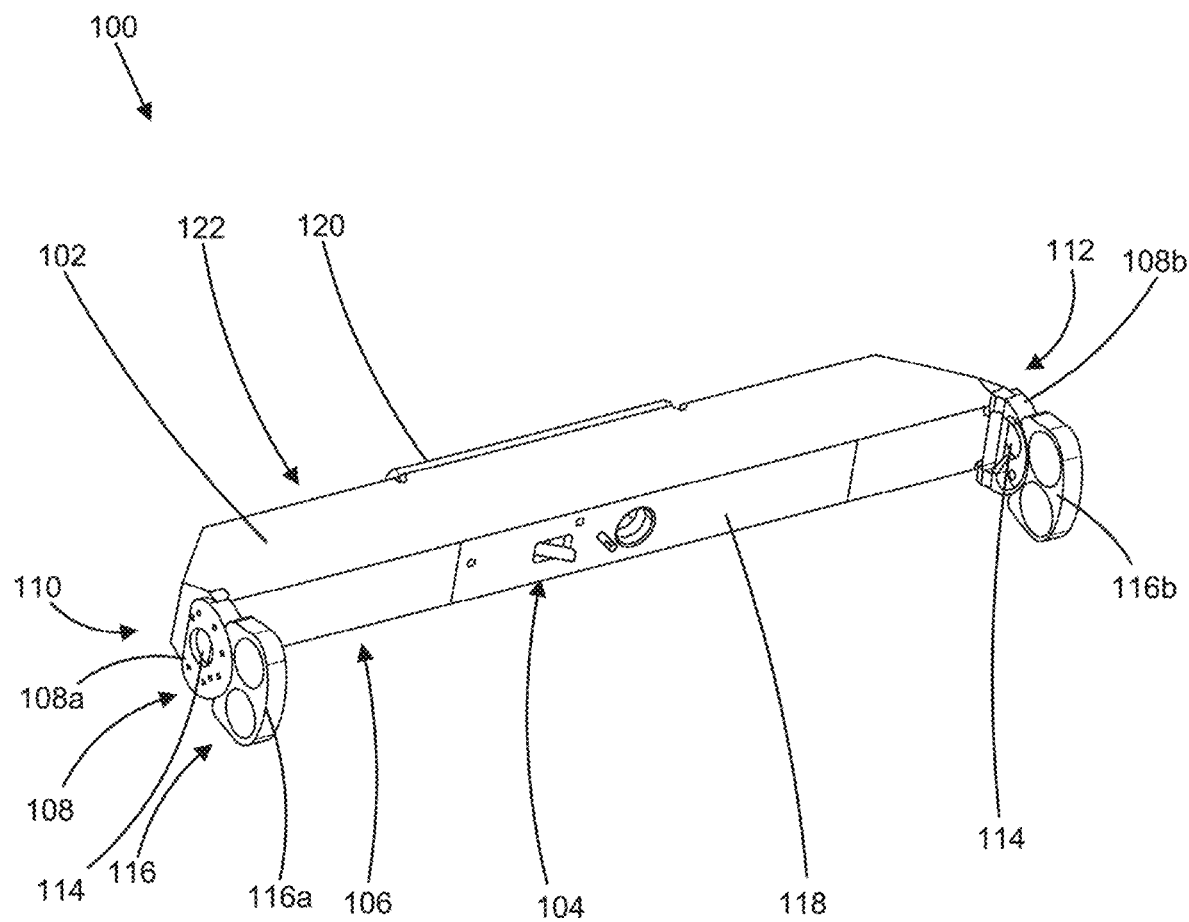
FIG. 1 illustrates an example metrology bridge, according to various embodiments.

Apparatuses, systems and methods associated with a metrology system for high-speed, non-contact coordinate measurements of parts are disclosed herein. In embodiments, a metrology system includes one or more metrology bridge(s) coupled to a measurement assembly. The bridge may include a housing, mounting members coupled to the housing, and a plurality of sensors mounted within the housing. The mounting members may couple the housing to the measurement assembly, possibly in a fashion that allows rotation (e.g. "rotatably" couple). Further, sensor elements of the plurality of sensor devices may be aligned along a length of the housing and may be directed out of the housing. The measurement assembly, in embodiments, includes a base and a platen to receive an object to be measured. The platen may move relative to the base on precise bearings.

The disclosed metrology system, in embodiments, offers a zero-touch approach to measuring an object, and further may offer high speed measurement capabilities. The metrology bridge may be equipped with one or more touchless sensors, e.g. lasers and optical sensors, in addition to or alternatively to traditional contact probes and other touch-based sensors. A zero-touch sensor can enable high speed measurements by not having to slow or stop to take a contact measurement. Further, a zero-touch sensor configuration can allow for easier placement of an object to be measured upon the platen, as lack of object contact obviates the need to fasten the measured object sufficiently securely such that a contact measurement probe will not displace the object and compromise measurement accuracy.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 illustrates an example metrology bridge 100, according to various embodiments. The metrology bridge 100 may couple to a measurement assembly and may be utilized for measurement of an object, or some portion thereof.

The metrology bridge 100 may include a housing 102. The housing 102 may comprise a rigid structure. In other embodiments, the housing 102 may comprise a semi-flexible structure, a rigid structure, or some combination thereof. In some embodiments, the housing 102 may be formed of aluminum, steel, stainless steel, ceramic, carbon fiber, plastic, or some combination thereof. The housing 102 may be elongated in one or more directions. Further, the housing 102 may include a plurality of sidewalls with a cavity enclosed by the sidewalls. In other embodiments, one or more of the sidewalls may be omitted, such as to provide easy access to the cavity.

The metrology bridge 100 may further include one or more sensor devices located within the cavity of the housing 102. In some embodiments, the sensor devices, or some portion thereof, may extend out of the cavity. The sensor devices may comprise contactless sensor devices. The utilization of contactless sensor devices along with taking measurements while a sensor device is in motion relative to the object being measured may allow for increased inspection speed of the object due to the lack of contact with the object and lack of requirement that the sensor and object be still relative to each other. Further, there exists less risk of damage to or defects induced within the object based on the lack of contact. In other embodiments, the sensor devices may comprise sensor devices utilize contact for measurement, contactless sensor devices, or some combination thereof.

Each of the sensor devices may have one or more sensor elements, such as the sensor elements 104. For example, the sensor elements 104 may include a lens of a camera, a lens of a laser, an extension member of confocal sensor device, a probe of a sensor device, or some combination thereof. The sensor elements 104 may be located at a first side 106 of the housing 102 and/or may be directed out of the housing 102. The sensor elements 104 may be directed along a plane that extends substantially from the first side 106 of the housing 102. In some embodiments, the sensor elements 104 may share a common focal plane at a predetermined distance from the housing 102. The sensor elements 104 sharing a common focal plane may allow for simultaneous capturing of information by multiple sensor devices, allowing for increased inspection speed. In still other embodiments, one or more sensor elements 104 may be configured to move within housing 102, such as via rotation or limited translation. Where a sensor element 104 is capable of such movement, additional axes of motion or freedom (e.g. seven, eight, or more axes) may be enabled, combined with movements from metrology bridge 100 and the object, as will be described below with respect to at least FIGS. 2A-2D.

The use of multiple sensor elements 104 may allow for simultaneous capture of multiple measurements at a single point in time, thereby potentially improving measurement throughput. In some embodiments, the multiple sensor elements 104 may be of an identical type, e.g. measuring tolerances or distances, so that multiple tolerances and/or dimensions of an object to be measured can be captured relatively simultaneously. In other embodiments, the multiple sensor elements 104 may be of different types, so that multiple types of measurement data of an object can be captured relatively simultaneously. In some embodiments, a sensor device may have multiple sensor elements 104, with each sensor element 104 oriented in a different fashion, to allow a single sensor device to potentially make multiple measurements in different directions or dimensions substantially simultaneously. For example, a single laser sensor may be equipped with two sensor elements 104 that are positioned orthogonally, so that measurements can be made simultaneously in downward and lateral directions. Such a configuration may be useful for inspecting a bore, where a depth of the bore can be measured concurrently with a radius or thread feature of the bore that is positioned radially.

In some embodiments, metrology bridge 100 may include one or more non-sensing tools as part of sensor elements 104. For purposes of this discussion, these tools may be considered sensor elements 104 due to their mounting in a common fashion. The non-sensing tools may allow for manipulation of the object to be measured in various ways, e.g. hole creation with a drill or boring tool, hole or gap filling via a filling tool (such as with an epoxy or other suitable resin or adhesive), a machining head, object manipulation to rotate or flip the object to allow other aspects of the object to be measured, etc.

In some embodiments, the housing 102 may include a removable mounting plate 118 mounted at the first side 106 of the housing 102. The sensor devices may be mounted to the removable mounting plate 118. The removable mounting plate 118 may be removed from the housing 102 and may be replaced by a different removable mounting plate 118 having different sensor devices.

In some embodiments, all or a portion of mounting plate 118 is configured to be moveable with respect to the housing 102, to enable sensor elements 104 to translate along the length of metrology bridge 100. This movement allows sensor elements 104 to be repositioned to accommodate the measurement of objects that, due to a relatively large size, limit the possible range of motion of the stage and platen. In some such embodiments, sensor elements 104 may have a first position in approximately the center of housing 102, as depicted in FIG. 1, and a second position proximate to first counterbalance 116a (such as around the location of the arrow for first side 106). In other embodiments, sensor elements 104 may have one or more additional third, fourth, fifth, etc. positions at various unique locations on housing 102, as the needs of a given implementation dictate. In some embodiments, for each position, sensor elements 104 may lock into a kinematic stop, which securely and repeatably locks the sensor elements 104 into a precise location with minimal or no position error. In such embodiments, sensor elements 104 may translate between such kinematic stops with a relatively simple mechanism that need not be calibrated to high precision.

In still other embodiments, metrology bridge 100 may be equipped with a high precision movement or mechanism for sensor elements 104, in addition to or in lieu of discrete kinematic stops. Such a mechanism may allow a virtually infinite number of positions for sensor elements 104 to be repeatably and accurately obtained without the need for one or more kinematic stops. Such a mechanism, to achieve repeatable accuracy to potentially a micron level, may need to account for factors such as gravity sag (particularly if metrology bridge 100 spans a relatively great distance, temperature fluctuations (where system 200 is not contained within a controlled micro-environment), vibration, etc.

Further, the housing 102 may include a removable panel 120 in some embodiments. The removable panel 120 may be located at a second side 122 of the housing 102, where the second side 122 may be located opposite to the first side 106. The removable panel 120 may be removed from the housing 102 allowing access to the sensor devices within the housing 102. Further, the removable panel 120 may be removed to provide for wire routing and/or space for sensor devices that may require additional space.

The metrology bridge 100 may further include one or more mounting members 108. For example, the metrology bridge 100 includes a first mounting member 108a and a second mounting member 108b in the illustrated embodiment. The first mounting member 108a may be located at a first end 110 of the housing 102 and the second mounting member 108b may be located at a second end 112 of the housing 102, where the second end 112 is opposite from the first end 110. The mounting members 108 may rotatably couple the housing 102 to the measurement assembly. For example, each of the mounting members 108 may include apertures, such as apertures 114, that engage with the measurement assembly. The metrology bridge 100 may rotate about the apertures 114.

The metrology bridge 100 may further include one or more counterbalances 116. The counterbalances 116 may be coupled to the mounting members 108 and may counterbalance the housing 102 about the mounting members 108. For example, the metrology bridge 100 may include a first counterbalance 116a and a second counterbalance 116b in the illustrated embodiment. The first counterbalance 116a may be coupled to the first mounting member 108a and the second counterbalance 116b may be coupled to the second mounting member 108b. The first counterbalance 116a may be coupled to an opposite side of the first mounting member 108a from the housing 102, and the second counterbalance 116b may be coupled to the opposite side of the second mounting member 108b from the housing 102.

The counterbalances 116 may be selected to be a weight substantially equal to the combined weight of the housing 102 and the sensor devices. For example, the counterbalances 116 may be selected to require a minimum amount of force to rotate the metrology bridge 206. In some embodiments, counterbalances 116 may be formed of aluminum, steel, stainless steel, or some combination thereof. The counterbalances 116 may be interchangeable in some embodiments. For example, the counterbalances 116 may be detachable from the mounting members 108 and may be replaced by counterbalances 116 of different weights, materials, and/or shapes. In other embodiments, the mounting members 108 with the counterbalances 116 may be detachable from the housing 102 and may be replaced by mounting members 108 with counterbalances 116 of different weights, materials, and/or shapes.

Figure 2A:
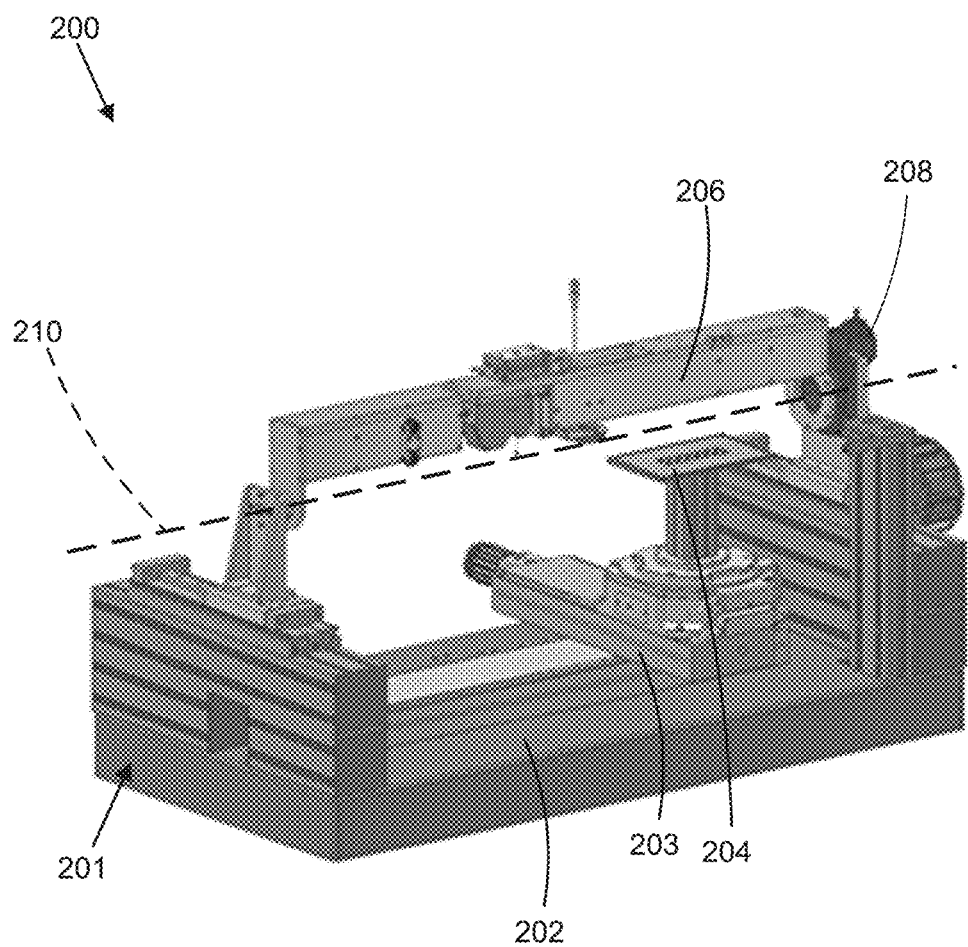
FIG. 2A illustrates an example measurement system assembly, according to various embodiments.
Figure 2B:
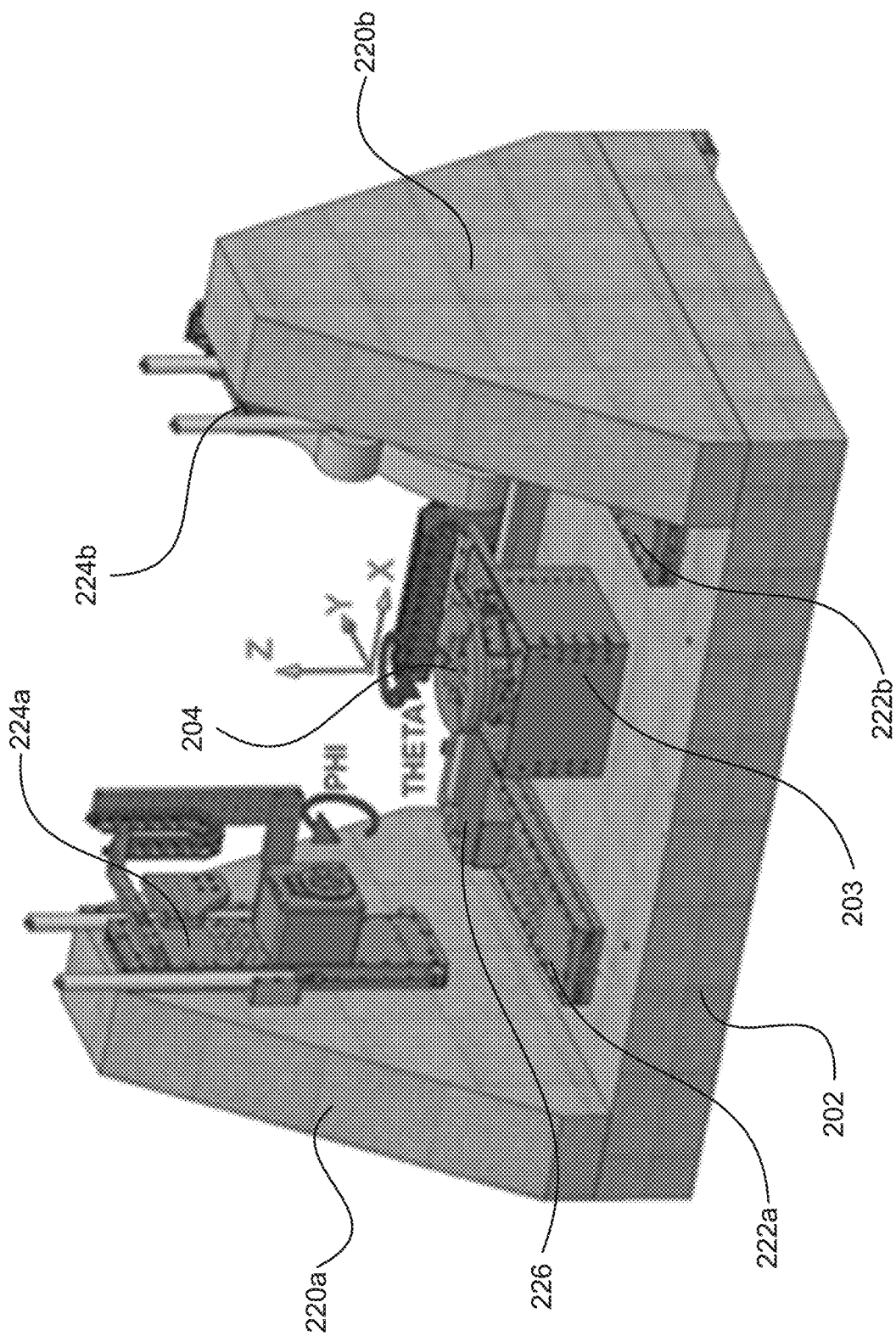
FIG. 2B illustrates a second example measurement system assembly with a different configuration of the stage and platen, according to various embodiments.

FIGS. 2A and 2B illustrate an example metrology system 200, according to various embodiments. The metrology system 200 may include a body 201. The metrology system 200 may further include a platen 204, that sits upon a stage 203, which in turn sits upon a base 202, where base 202 is part of body 201. The platen 204 may be located at a side of the body 201. The platen 204 may receive an object to be measured.

The metrology system 200 may further include a metrology bridge 206. The metrology bridge 206 may include one or more of the features of the metrology bridge 100 (FIG. 1). The metrology bridge 206 may be rotatably coupled to the body 201 of the measurement assembly by one or more mounting members, such as the mounting members 108 (FIG. 1). Sensor elements of sensor devices located within the metrology bridge 206 may be directed toward the platen 204. For example, the sensor elements may be directed along a plane that intersects the platen 204 and/or may have a common focal plane directed at the platen 204. In some embodiments, metrology system 200 may include multiple metrology bridges 206, that may be configured for independent movement. For example, each metrology bridge 206 may be independently moveable in both a Z and a phi axis, to be discussed in more detail below. Where multiple metrology bridges 206 are equipped to system 200, the bridges may each have identical or different sensor packages, depending upon the needs of a given embodiment. Identical sensor packages may allow simultaneous measurement of different portions of an object with a common type of measurement, to potentially improve throughput. Different sensor packages may allow simultaneous measurement of different aspects of the object, e.g. depth and surface texture or finish, etc.

The metrology system 200 may further include a motor 208. The motor 208 may be affixed to the body 201 of the metrology system 200. The motor 208 may act upon the metrology bridge 206 and cause the metrology bridge 206 to rotate about an axis of rotation 210. The axis of rotation 210 may be coincident with a focal plane and/or a focal line of the sensor elements of the sensor devices within the metrology bridge 206. For example, the sensor elements may be directed toward the axis of rotation 210. The motor 208 being affixed to the body 201 may provide for smoother rotation of the metrology bridge 206 and can provide for better accuracy of positioning of the metrology bridge 206.

Base 202 comprises a part of body 201. In embodiments, base 202 may be constructed of a relatively massive/heavy material, such as stone. In some embodiments, the stone is granite, which can provide a relatively temperature insensitive, vibration resistant, and precisely dimensioned base from which to make measurements. As metrology system 200 may be required to make measurements with sub-micron or greater precision, a stable base 202 is crucial, and can serve as a calibration or reference datum from which the sensors in metrology bridge 206 can calibrate. In some embodiments, base 202 may be equipped with specific features configured to act as calibration targets; by permanent affixation to base 202, these targets present highly precise known reference points with which metrology system 200 may calibrate the various sensor elements 104 in metrology bridge 206.

System 200 may, in embodiments, be configured to self-calibrate on an as-commanded or routine basis. Base 202, or another part of system 200, may be configured with one or more calibration targets or mechanisms to allow self-calibration. In some embodiments, system 200 may be configured to perform a self-check/self-calibration during inspection and measurement of an object, to ensure that acceptable accuracy is maintained.

In some embodiments, base 202, or another part of body 201, may further employ passive and/or active vibration cancellation techniques, to optimize measurement precision. For example, in addition to vibration damping assemblies (e.g. vibration isolating assemblies, supports), one or more motion sensors may be equipped to body 201, metrology bridge 206 and/or base 202 to detect vibrations transmitted through the metrology system 200, and employ anti-vibration mechanism(s) (such as a counterweight or mass damper), factor the vibration movements into the measurement errors, or a combination of both techniques or possibly other techniques to suppress vibration-induced measurement errors.

Metrology system 200, in the depicted embodiment, includes a kinematic stage 203, upon which platen 204 is disposed. Stage 203 itself may rest upon base 202. In embodiments, stage 203 is configured to move relative to base 202, and thereby move platen 204, and any object secured to platen 204. Where stage 203 is configured to move, an object on platen 204 may be measured both either sensors in metrology bridge 206 being moved around the object, by the object itself being moved relative to the sensors in metrology bridge 206 (by virtue of stage 203 moving relative to base 202), or a combination of both.

Stage 203 may move relative to base 202 on one or more bearings, such as fluid bearings, discussed below. The bearings, if implemented as a fluid bearing, may be powered by pressurized air supply delivered to stage 203 or, in some embodiments, to at least a portion of base 202, or both. The use of air or other types of fluid bearings allows stage 203 to move across base 202 in a relative frictionless fashion, which allows measurement precision to be maintained where friction and other mechanical phenomena may otherwise act to diminish the precision by which stage 203 may be placed relative to base 202 and the sensors in metrology bridge 206. Maintaining this precision also enables stage 203 in conjunction with or alternatively to base 202 to be used as a reference datum for sensor calibration and measurement. Stage 203 itself may be manufactured from a similarly heavy/dense material as base 202.

In other embodiments, system 200 may be equipped with multiple stages 203, to accommodate measurement of multiple objects, potentially simultaneously. In other embodiments, system 200 may be equipped to accept multiple objects on a single stage 203, and possibly upon a single platen 204. In either example embodiment, system 200 may be configured, via software or other control logic, to measure each object in turn automatically. In still other possible embodiments, a system 200 so configured may be able to measure each object simultaneously, such as where system 200 is equipped with multiple metrology bridges 206 and/or multiple sensor devices (including multiple sensor elements) in a single metrology bridge 206. In some embodiments, each object of the multiple objects may be measured in a different coordinate system, as will be discussed below.

In some embodiments, the bearings supporting stage 203 may be independent for one or more axes. For example, stage 203 may be capable of translation movement in both an x and y axis, e.g. across the surface of base 202, rather than stage 203 resting upon a single axis rail (e.g. x only), which in turn supports a second axis rail (e.g. y only). The use of independent axis movements prevents positional errors from stacking. This configuration is illustrated in FIGS. 2B and 2D, as will be discussed below.

Figure 2C:
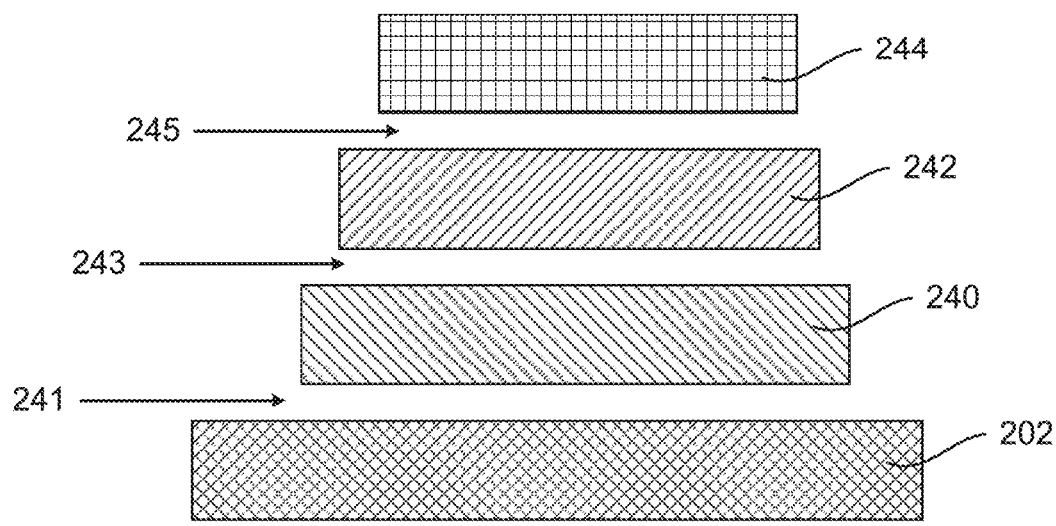
FIG. 2C is a diagram of a stacked arrangement of movement axes, according to some embodiments.

For example, where a movement for they axis rests upon a rail or bearing that only moves in the x axis (similar to the depiction of FIG. 2A), any error in x axis positioning automatically is passed to they axis, which itself may introduce its own error. Thus, any position of an object moved by stage 203 with stacked movements results in a cumulative error from across all stacked axes. This arrangement is diagrammatically depicted in FIG. 2C. In FIG. 2C, base 202 supports an X-stage 240, which in turn supports a Y-stage 242, which in turn supports a Z-(and possibly theta, depending upon the configuration of a given system 200) stage 244. X-stage 240 may introduce a positional error 241 relative to base 202. Similarly, Y-stage 242 may introduce a positional error 243 relative to X-stage 240, and Z-stage 244 may introduce a positional error 245 relative to Y-stage 242. As each positional error 241, 243, and 245 are relative to the previous stage, the positional errors combine additively to result in an overall error that may be larger than acceptable tolerances. Such errors may be minimized, but potentially at great cost to achieve an error within acceptable tolerances.

Figure 2D:
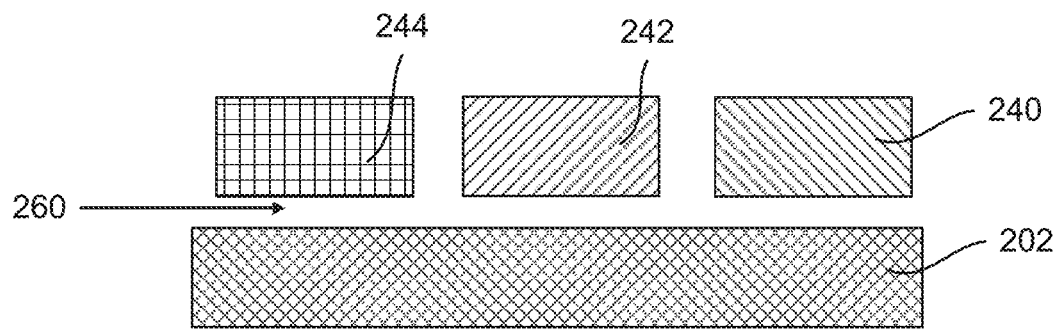
FIG. 2D is a diagram of an independent arrangement of movement axes, according to various embodiments.

In contrast, and as depicted in FIGS. 2B and 2D, in embodiments where the stage 203 independently moves in x and y axes, an error in position of one axis does not translate to the other, thus allowing for improved positional accuracy. Considering FIG. 2D, each of X-stage 240, Y-stage 242 and/or Z-stage 244 is directly moved relative to base 202, and as such, the positional error 260 of each stage is independent, and does not stack. Thus, the overall error, in contrast to the additive error of the configuration of FIGS. 2A and 2C, is simply the error 260 presented by any given single stage, without influence from the positional errors of the other stages.

FIG. 2B depicts an alternative embodiment for system 200 that incorporates independent stages. As may be seen, the embodiment of FIG. 2B includes the base 202 of FIG. 2A, which may be made from granite or another suitably massive and relatively stable material. Upon base 202 rests stage 203, upon which is platen 204. Unlike the configuration of FIG. 2A, stage 203 is coupled to an X-stage 226 that is independent from Y-stage 222a and Y'-stage 222b. In the depicted embodiment, the Y-stage is split between Y and Y', which move in synchronization to provide adequate precision of movement of stage 203 in the Y axis. The stages are independent as the stage 203 rests directly atop base 202, and so all movements in both X and Y axes are made relative to base 202, as opposed to a lower-placed stage depicted in FIG. 2C. Further, platen 204, which supports an object to be measured and references the X and Y plane established by base 202 via stage 203, may also move in a theta axis (rotation). The theta axis movement, in embodiments, is supplied by stage 203, such as via a motor (pneumatic, hydraulic, electric, or another suitable mechanism), and is further referenced to base 202 via stage 203. As will be discussed below, in some embodiments, stage 203 itself may be configured to rotate along the theta axis directly against base 202. Such embodiments may allow platen 204 to be fixed in position relative to stage 203, such as to reduce possible positional error and/or to simplify construction of stage 203 and platen 204. While FIG. 2B shows the gantry for X-stage 226 moving atop Y and Y'-stages 222a and 222b to permit stage 203 to be coupled for movement via a single mechanical connection, other embodiments may place the X-stage 226 directly atop base 202, with X and Y stages mechanically coupled separately to stage 203.

Also visible in FIG. 2B are two upright portions 220a and 220b of base 202. The upright portions 220a and 220b may be integral with base 202 and/or constructed from a similar or identical material. Upright portions 220a and 220b support metrology bridge 100 in a stable fashion. While two upright portions 220a and 220b are depicted, other embodiments may have none, one, or more upright portions. Moreover, the upright portions 220a and 220b may be substantially identical in configuration (as shown), or may differ in configuration from each other, as the needs of a given implementation require. Upright portions 220a and 220b may be manufactured from identical or different materials. In some embodiments, upright portions 220a and 220b are formed as part of base 202 (e.g. integral). In other embodiments, upright portions 220a and 220b are constructed as separate structures, and subsequently joined or disposed upon base 202. In either construction, base 202 is intended to include any upright portions 220a, 220b (or more), as upright portions 220a and 220b effectively act as extensions of base 202 to provide a solid support for any equipment, such as metrology bridge 100 and corresponding motion equipment.

Metrology bridge 100, in the depicted embodiment, is moved in an independent Z-axis via Z-stage 224a and Z'-stage 224b. Z-stages 224a and 224b, as with Y-stages 222a and 222b, move in a synchronized fashion, and act to raise or lower metrology bridge 100 along the Z axis indicated in FIG. 2B. As with the X, Y, and (in some embodiments) Theta stages, the Z stage moves independently and directly relative to base 202 (including upright portions 220a and 220b). FIG. 2B depicts additional axes theta (rotation of platen 204) and phi (rotation of metrology bridge 100), to provide at least five degrees of movement. In embodiments, platen 204 may be configured to move in a theta (rotational) axis, noted in FIG. 2B. Some such embodiments may provide such rotation relative to stage 203. Other embodiments may provide such rotation relative to base 202 as a third independent axis for stage 203. In such embodiments, platen 204 may be fixed relative to stage 203 (or may simply be integrated into stage 203), with rotation provided through stage 203.

While the embodiments depicted in FIGS. 2A to 2D express degrees of motion in a Cartesian system (X, Y, Z, Theta, possibly Phi), it should be understood that this is not intended to be limiting. System 200 may use other coordinate/positioning systems to express degrees of movement, such as R-Theta, where position is expressed in terms of object rotation and radius, along with an ascension/declination axis, which may be appropriate for substantially spherical objects. An R-H or R-Z system may be appropriate for substantially cylindrical objects, with position expressed in terms of radial distance and height, and further with a rotational component. Other coordinate systems may be appropriate, e.g. polar, depending upon the nature of a measured object. In such embodiments, the various stages depicted above may be reconfigured as appropriate to independently move in the different system axes. Alternatively, system 200 may be configured (such as by controlling software) to translate between inputs in one coordinate system and the coordinate system native to system 200. For example, system 200 may be configured to accept positions for measurement expressed in an R-Theta system and translate those positions into X, Y, and Z (plus theta, phi, etc), if system 200 is configured with a Cartesian system.

The use of air bearings to move stage 203 can facilitate such independent axis movements. In the example depicted in FIG. 2A, while the x, y, and Theta axes are stacked, the metrology bridge 206 is rotated and moved (and thus, the sensor elements on the bridge 206) separately from the stage 203 and platen 204, allowing z and Phi (rotation of the metrology bridge 206) axes to remain independent. Employing a stage 203 with independent x and y axes, and (in embodiments) an independent theta axis further allows positional errors to be limited only to a single axis error, with no accumulation of errors. The air bearings may be implemented by supplying air, which may be compressed, to stage 203 to activate the air bearings. Further, while air bearings are one possible implementation, in other embodiments stage 203 (and possibly other components of system 200 that move) may employ different types of bearings, such as fluid (of which an air bearing may be considered a type), e.g. hydraulic, mechanical bearings (such as journals, ball bearings, needle bearings, race bearings, etc), electromagnetic, or any other suitable type of bearing that can support the weight of an object being measured and allow relatively frictionless and easy movement of stage 203.

By employing one or more zero-touch sensors, platen 204 may be somewhat simplified by obviating the need to means to securely hold the object to be measured. Instead, a simple clamp or pin, or a universal base equipped to quickly receive and release object shape-specific holders may be employed to allow for rapid changing of objects to be measured. Such rapid changing can allow metrology system 200 to be rapidly switched between different objects without loss of productivity relative to conventional known metrology systems.

While the metrology system 200 is illustrated with the single metrology bridge 206, it is to be understood that the metrology system 200 may include a plurality of metrology bridges, such as the metrology bridge 206, in other embodiments. In some of these embodiments, each of the metrology bridges may be coupled to the body 201 at the same point and each may rotate about the axis of rotation 210 (e.g., a phi axis). In other of these embodiments, the metrology bridges may be coupled to the body 201 at different locations and may rotate about different axes of rotation.

In some additional embodiments, metrology system 200 may be equipped to a mechanism to allow an object to be measured to be automatically loaded or unloaded from platen 204. As mentioned above with respect to FIG. 1, metrology bridge 100 may be equipped with sensor elements 104 that are capable of manipulating an object; such sensor elements 104 could be configured to place an object upon platen 204, possibly in conjunction with movements from stage 203. Still further, where sensor elements 104 include visual scanners (e.g. optical cameras or sensors that can detect an object shape), metrology apparatus 200 may be configured to allow placement of an object on platen 204 in any arbitrary position, with a camera or other suitable sensor being used to detect the orientation and location of the object and adjust the object inspection plan accordingly. In other embodiments, metrology bridge 100 may act to reposition the object, based upon its detected position, to a desired position for use with the object inspection plan. In still other embodiments, the camera or other sensor may be used to detect the type of object, and, via object recognition techniques (such as those known in the art) load the appropriate object inspection plan for an effectively automatic measurement process.

Although not depicted in FIG. 2A or 2B, metrology system 200 may include or be located within an enclosure for micro-environmental control of various factors such as temperature, humidity, air pressure, ensuring zero air movements, etc., for applications where the precision of measurement of objects may be critically affected by environmental factors. Further still, metrology system 200 may include operational software that can run upon one or more control units or devices that drive and/or coordinate operations of the various system on metrology apparatus 200, such as the actuators to move stage 203 (and by extension, platen 204), rotate platen 204, as well as one or more motors 208 that may be connected to and drive metrology bridge 206 or some component thereof. Further, the software may coordinate triggering and receiving measurements from one or more sensors that may be equipped to metrology bridge 206. Working in concert with the various actuators, the software can automate collection of a point cloud of measurements for any object to be measured. The software itself may run on a microcontroller, PC, dedicated hardware, or some combination of the foregoing; moreover, the software may be implemented in whole or in part in the form of firmware or, in some embodiments, hardware, such as a custom-designed application specific integrated circuit (ASIC), field-programmable gate array (FPGA), or some other suitable device or combination of devices and/or software.

Figure 3:
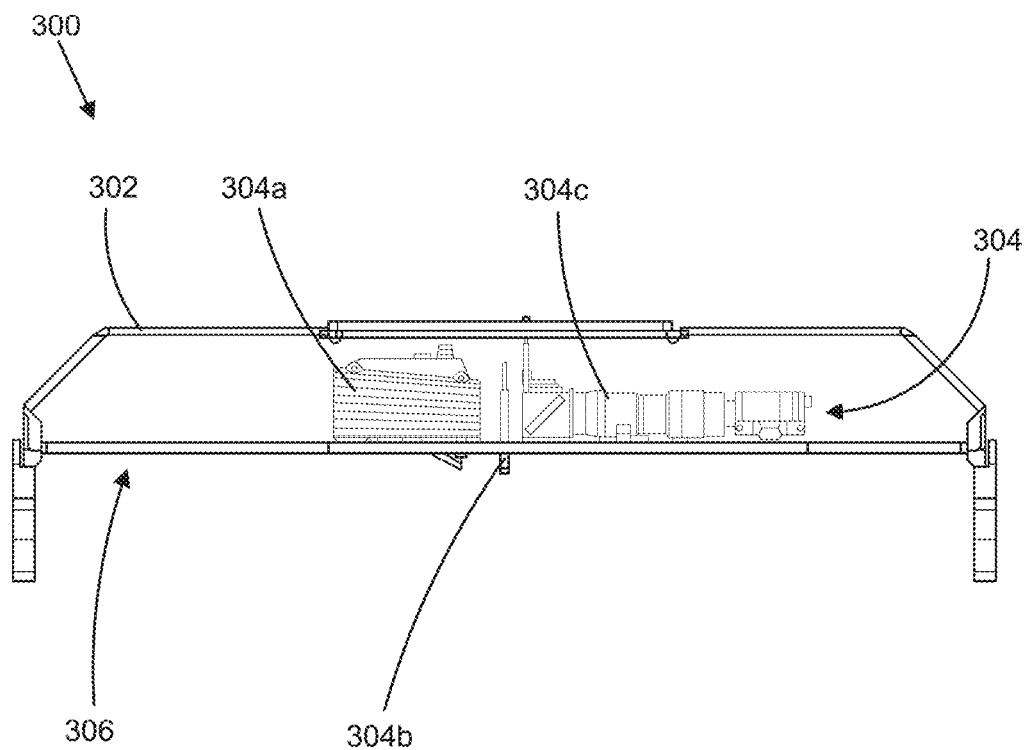
FIG. 3 illustrates a side view of an example metrology bridge, according to various embodiments.

FIG. 3 illustrates a side view of an example metrology bridge 300, according to various embodiments. The metrology bridge 300 may include one or more of the features of the metrology bridge 100 (FIG. 1). For example, the metrology bridge 300 may include a housing 302, which may include one or more of the features of the housing 102 (FIG. 1) including a cavity 304.

The metrology bridge 300 may include a plurality of sensor devices 304 located within the cavity 304. For example, the metrology bridge 300 includes a first sensor device 304a, a second sensor device 304b, and a third sensor device 304c located within the cavity 304 in the illustrated embodiment. The first sensor device 304a is a laser device, the second sensor device 304b is a confocal sensor device, and the third sensor device 304c is a camera device in the illustrated embodiment. In other embodiments, the plurality of sensor devices 304 may include point lasers, line scan lasers, direct light modeling lasers, white light sensors, interferometers, video sensors, camera sensors, confocal sensors, color sensors, adhesion sensors, humidity sensors, temperature sensors, surface finish sensors, capacitance sensors, touch probe sensors, air gauge sensors, ultrasonic sensors, x-ray sensors, imaging sensors, deep learning sensors, white light interferometry sensors, chromatic confocal sensors, stereo line scan sensors, laser triangulation sensors, white light confocal sensors, vision sensors, infrared sensors, X-ray sensors, other sensors appropriate to a given implementation, or some combination thereof.

The plurality of sensor devices 304 may be mounted to the housing 302 at a side 306 of the housing 302. The sensor devices 304 may be selected with respect to, and/or may impact, the types of measurements and/or other inspections that metrology system 200 can perform. In one possible embodiment, employing a sensor device 304 that includes a contactless sensor that can read measurements laterally (e.g. may be able to measure orthogonally from a longitudinal axis of the sensor) can enable measurements into relatively deep surface features. For example, a bore or (possibly) threaded hole can be inspected using such a sensor configuration, as the sensor device 304 can insert into the bore and measure thread and/or other bore features by sensing laterally. In some embodiments, sensor device 304 may be capable of extension and retraction independent from any Z-axis movement of the metrology bridge 300, and may further be capable of independent rotation, separate from any theta-axis movement of platen 204/stage 203.

Figure 4:
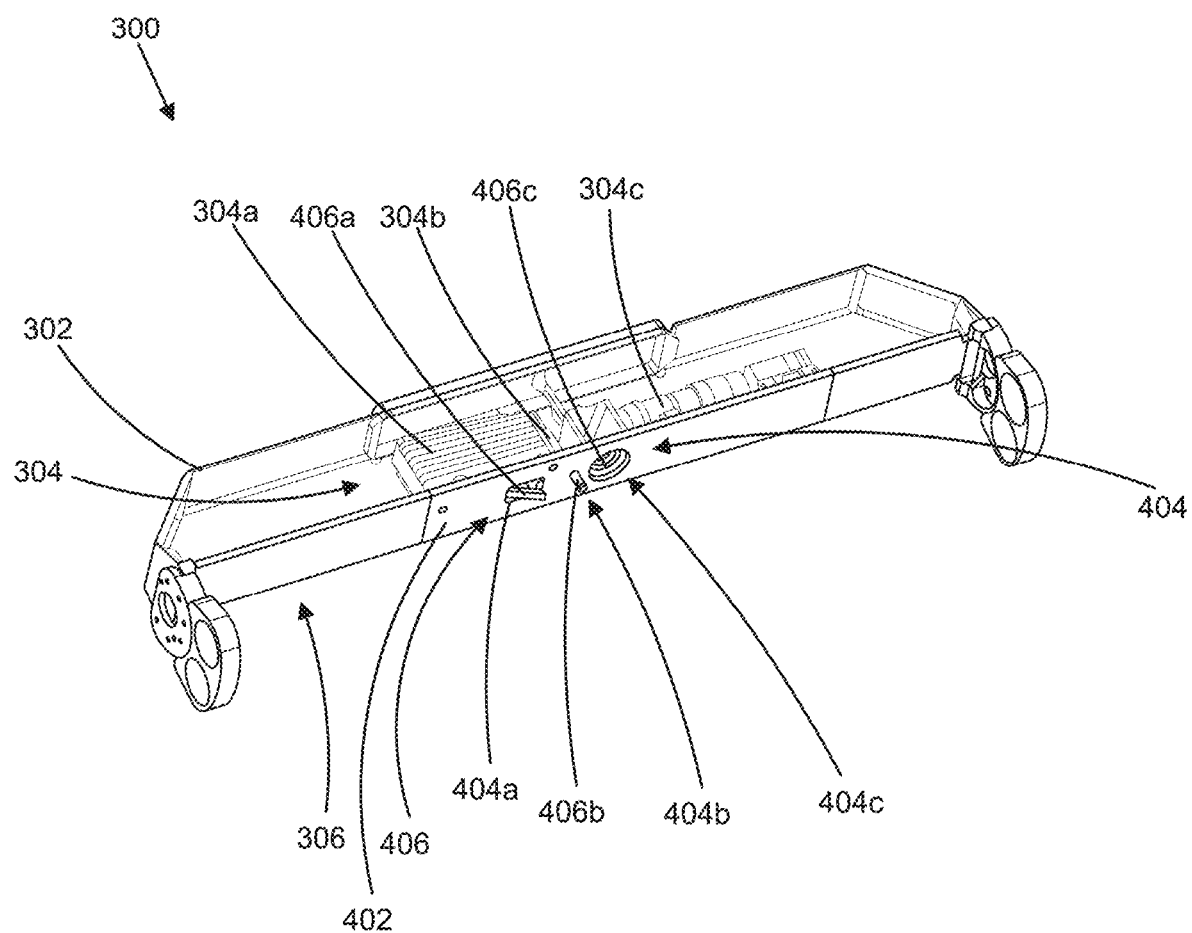
FIG. 4 illustrates a perspective view of the example metrology bridge of FIG. 3, according to various embodiments.

FIG. 4 illustrates a perspective view of the example metrology bridge 300 of FIG. 3, according to various embodiments. The metrology bridge 300 may include a removable mounting plate 402 located at the side 306 of the housing 302. The sensor devices 304 may be mounted to the removable mounting plate 402. Further, the removable mounting plate 402 may have a plurality of openings 404 for sensor elements 406 of the sensor devices 304. In particular, the removable mounting plate 402 has a first opening 404a that corresponds to a laser lens 406a of the first sensor device 304a, a second opening 404b that corresponds to a displacement member 406b of the second sensor device 304b, and a third opening 404c that corresponds to a camera lens 406c of the third sensor device 304c in the illustrated embodiment.

The removable mounting plate 402 may be removed from the housing 302 and replaced by another removable mounting plate. The other removable mounting plate may have different sensor devices mounted to the removable mounting plate. Further, the other removable mounting plate may have different openings for the sensor elements of the different sensor devices. Sensor elements, such as the sensor elements 406, may comprise laser lens, displacement members, camera lens, speakers, humidity sensor receptors, probes, or some combination thereof.

The sensor elements 406 of the sensor devices 304 may be directed in a same direction. Further, the sensor elements 406 may be aligned in a linear fashion along a length of the housing 302. For example, the sensor elements 406 may be directed along a plane that extends substantially (within 5 degrees) perpendicular from the side 306 of the housing 302. Further, sensor elements 406 may share a common focal plane in some embodiments. The openings 404 may further be aligned in a linear fashion along the length of the housing 302.

Figure 5:
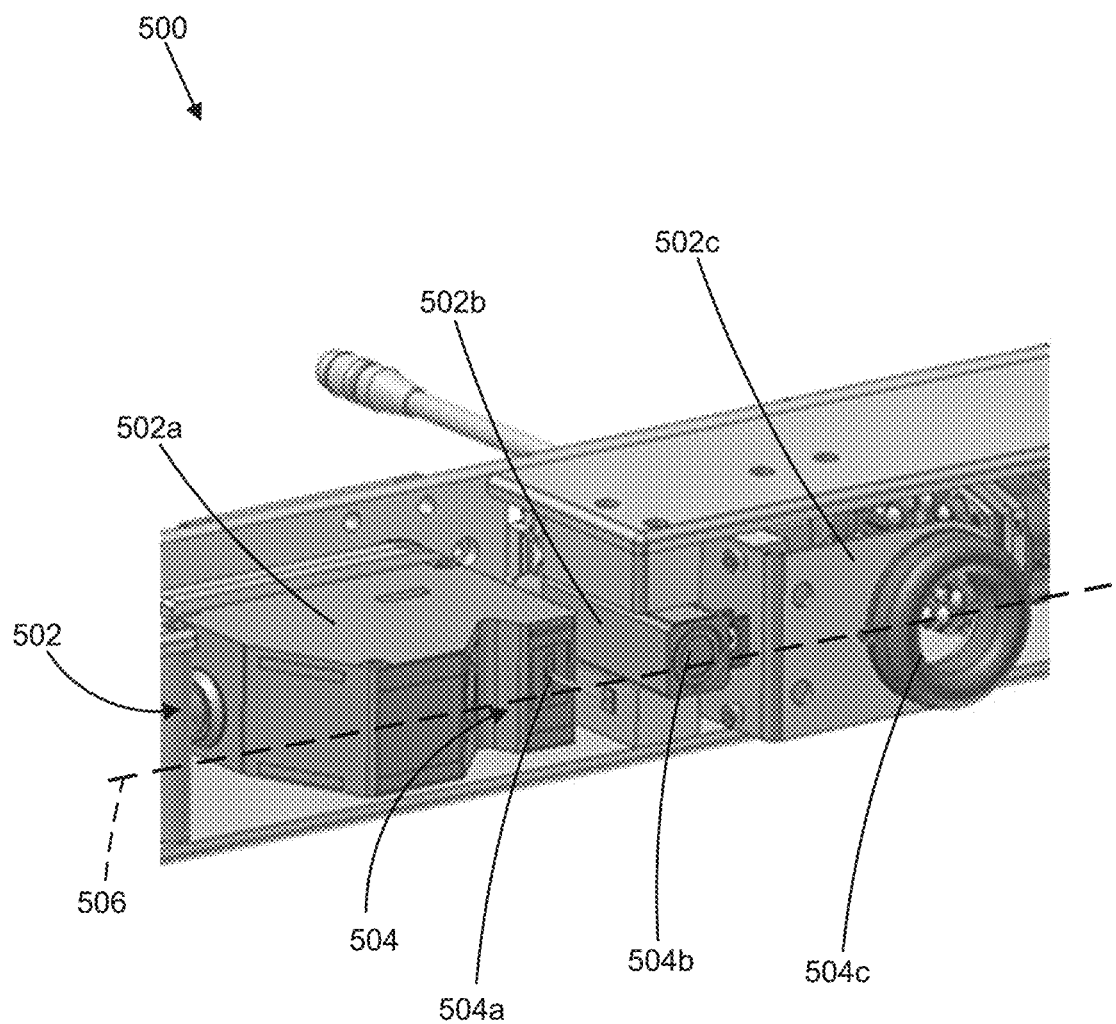
FIG. 5 illustrates an example sensor device arrangement, according to various embodiments.

FIG. 5 illustrates an example sensor device arrangement 500, according to various embodiments. The sensor device arrangement 500 may be implemented within a metrology bridge, such as the metrology bridge 100 (FIG. 1), the metrology bridge 206 (FIG. 2A), and/or the metrology bridge 300 (FIG. 3).

The sensor device arrangement 500 may include a plurality of sensor devices 502. In the illustrated embodiment, the sensor device arrangement 500 includes a first sensor device 502a, a second sensor device 502b, and a third sensor device 502c. In other embodiments, the sensor device arrangement 500 may include two or more sensor devices 502.

Each of the sensor devices 502 may include a sensor element 504. The sensor element 504 may comprise a portion of the sensor device 502 at which external data for the sensor device 502 is collected. For example, the sensor element 504 for a laser sensor device comprises a laser lens through which the laser is emitted and data is collected, the sensor element 504 for a confocal sensor device comprises an extension member (discussed in greater detail below) that extends from the confocal sensor device and collects data, and a camera lens through which an image is captured. The sensor elements 504 may be aligned along a length of a housing in which the sensor devices 502 are located. For example, the laser lens 504a of the first sensor device 502a, the extension member 504b of the second sensor device 502b, and the camera lens 504c of the third sensor device 502c are aligned along the length of the housing, as indicated by line 506.

Figure 6:
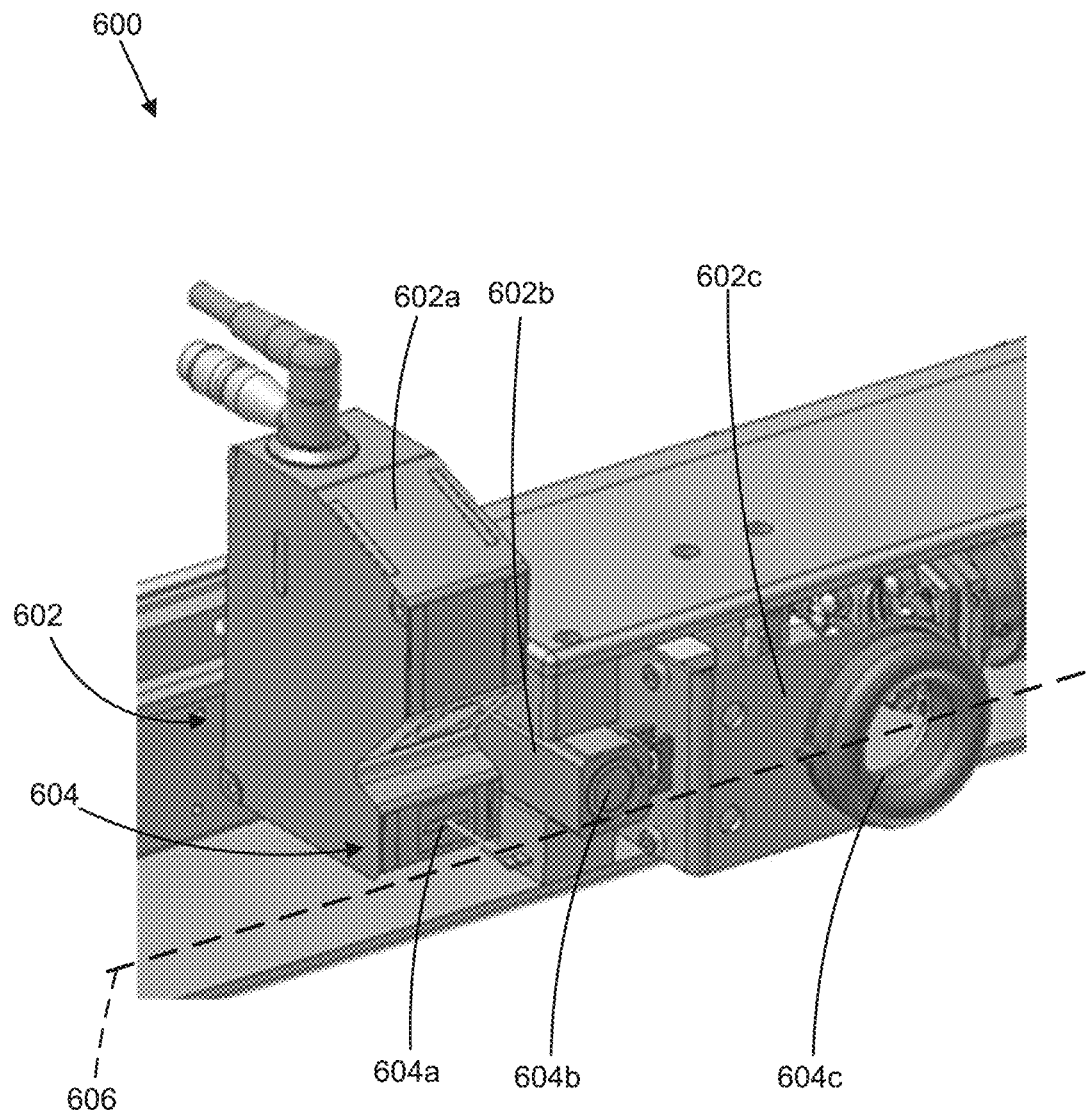
FIG. 6 illustrates an example sensor device arrangement, according to various embodiments.

FIG. 6 illustrates an example sensor device arrangement 600, according to various embodiments. The sensor device arrangement 600 may be implemented within a metrology bridge, such as the metrology bridge 100 (FIG. 1), the metrology bridge 206 (FIG. 2A), and/or the metrology bridge 300 (FIG. 3).

The sensor device arrangement 600 may include a plurality of sensor devices 602. In the illustrated embodiment, the sensor device arrangement 600 includes a first sensor device 602a, a second sensor device 602b, and a third sensor device 602c. The first sensor device 602a, the second sensor device 602b, and the third sensor device 602c may be the same sensor devices as the first sensor device 502a (FIG. 5), the second sensor device 502b (FIG. 5), and the third sensor device 502c (FIG. 5), respectively. The first sensor device 602a of the sensor device arrangement 600 may be mounted in a different direction than the first sensor device 502a of the sensor device arrangement 500 (FIG. 5). In particular, the first sensor device 602a may be mounted in an orientation that is 90 degrees different from the orientation of the first sensor 502a.

Each of the sensor devices 602 may include a sensor element 604. The sensor elements 604 may be aligned along a length of a housing in which the sensor devices 602 are located. For example, the laser lens 604a of the first sensor device 602a, the extension member 604b of the second sensor device 602b, and the camera lens 604c of the third sensor device 602c are aligned along the length of the housing, as indicated by line 606.

Figure 7:
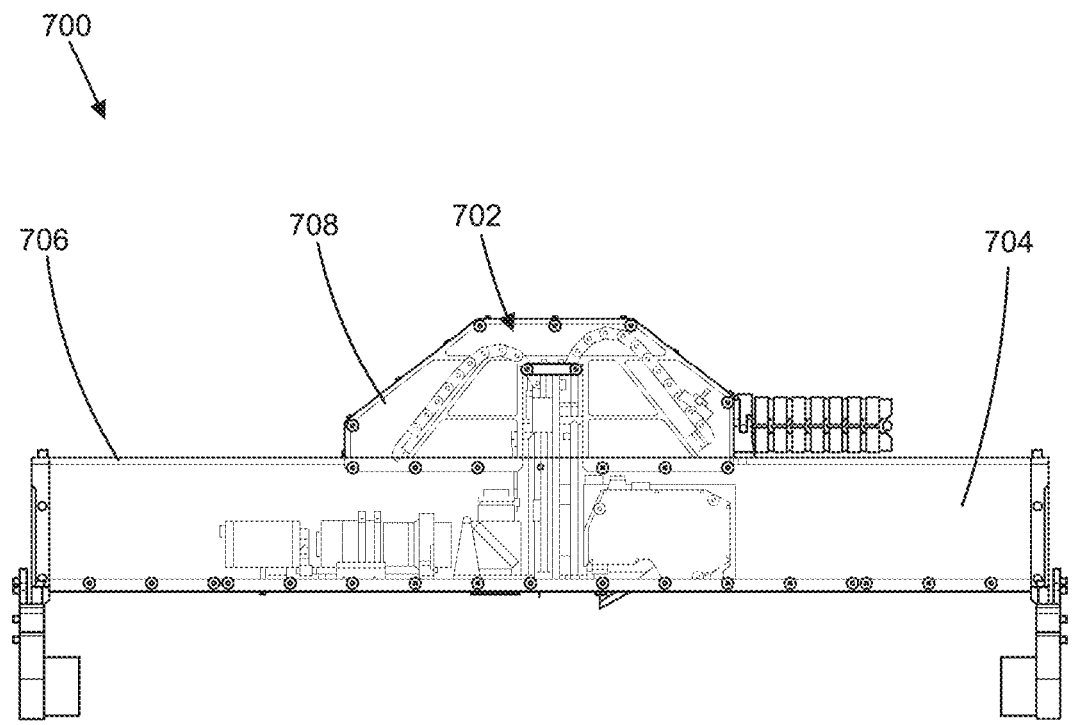
FIG. 7 illustrates an example metrology bridge with a confocal sensor assembly, according to various embodiments.

FIG. 7 illustrates an example metrology bridge 700 with a sensor assembly 702, according to various embodiments. The metrology bridge 700 may include one or more of the features of the metrology bridge 100 (FIG. 1), the metrology bridge 206 (FIG. 2A), and/or the metrology bridge 300 (FIG. 3). In the illustrated embodiment, the sensor assembly 702 includes two sensor devices. In other embodiments, the sensor assembly 702 may include one or more sensor devices. While the depicted embodiment of FIGS. 7-11 is a confocal sensor, it should be understood that this is for example only. Sensor assembly 702 may be any suitable sensor type that can benefit from the movements and kinematic positioning described below. Sensor assembly 702 may include zero, one, or more confocal sensors.

The sensor assembly 702 may be located partially within a cavity 704 of a housing 706 of the metrology bridge 700. The metrology bridge 700 may include an add-on housing 708 that couples to the housing 706 and houses the portion of the sensor assembly 702 that extends out of the cavity 704. In particular, a removable panel (such as the removable panel 120 (FIG. 1)) may be removed from the housing 706 and the add-on housing 708 may be coupled to the housing 706 in place of the removable panel.

Figure 8:
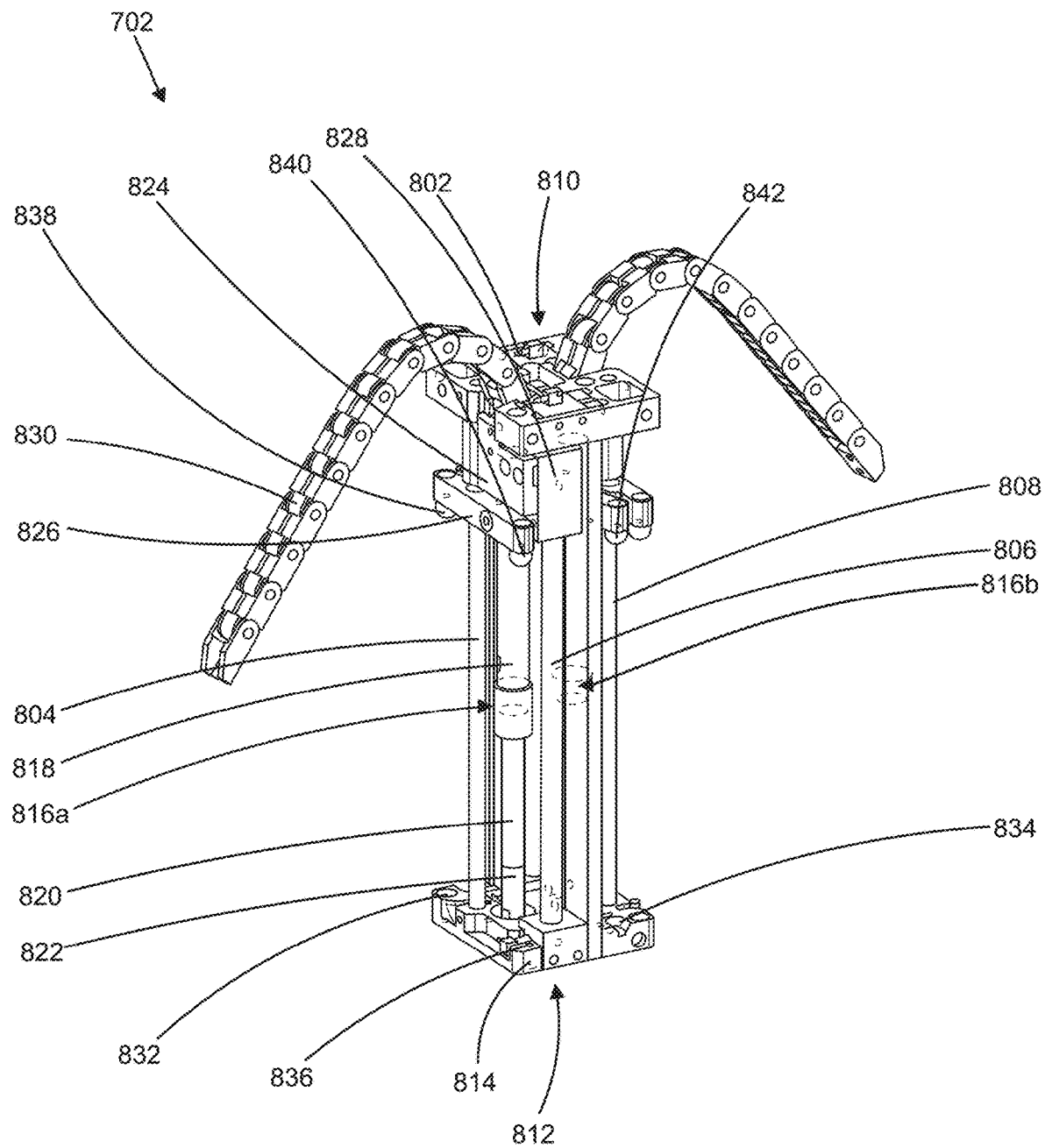
FIG. 8 illustrates the example confocal sensor assembly of FIG. 7, according to various embodiments.

FIG. 8 illustrates the example sensor assembly 702 of FIG. 7, according to various embodiments. The sensor assembly 702 may include a guide 802. The guide 802 may support one or more sensor devices (of the same or a different type) and provide structure for guiding portions of the sensor devices as the portions are extended and retracted. For example, the guide 802 includes a first rod 804 and a second rod 808 in the illustrated embodiment. The first rod 804 and the second rod 808 may extend from a first end 810 of the guide 802 to a second end 812 of the guide 802. The guide 802 may couple to a housing (such as the housing 706 (FIG. 7)) for mounting the sensor devices within the housing.

The portions, in embodiments such as the illustrated embodiment, are extended/retracted with a drive mechanism such as a pneumatic cylinder 806. Although the illustrated embodiment uses a pneumatic cylinder, other embodiments may drive cylinder 806 by other means, such as electric, hydraulic, or another suitable source of power. Still other embodiments may drive the various portions using an alternative mechanism to cylinder 806, e.g. a geared or belted drive, jack screw, or another suitable mechanism that can drive the portions with a suitable accuracy and control.

The guide 802 may include a kinematic positioning element 814. The kinematic positioning element 814 may be located at the second end 812 of the guide 802. Kinematic position element 814, in embodiments, couples with a kinematic frame 826 (such as by first rod 804 and second rod 808) to form a kinematic mount that carries one or more sensor devices 816a and 816b, to be discussed in greater detail below. In embodiments, the kinematic positioning element 814 is translated along the first rod 804 and/or the second rod 808 via motion from cylinder 806. The kinematic positioning element 814 may facilitate kinematic positioning of extension members of the sensor devices, as described further throughout this disclosure. For example, the kinematic positioning element 814 may include three contact points to facilitate kinematic positioning of an extension member. For example, the kinematic positioning element 814 may include a first recess 832, a second recess 834, and a contact point 836 to facilitate kinematic positioning in the illustrated embodiment. Other embodiments may have a third recess (not shown), or more or fewer recesses depending upon the needs of a given implementation.

The sensor assembly 702 may include one or more sensor devices 816a and 816b (816b is depicted by to dashed circles, but is not otherwise visible), collectively referred to as 816. For example, in the depicted embodiment the sensor assembly 702 includes a first sensor device 816a and a second sensor device 816b; other embodiments may only have a single sensor device 816, or may have more than two sensor devices 816. For brevity, features related to the first sensor device 816a are described herein. It is to be understood that the second sensor device 816b (and any other additional such devices) may include one or more of the features of the first sensor device 816a.

The first sensor device 816a may include an extension member comprised of an extension housing 818 and extension 820. Extension 820 may further comprise a sensor element 822 of the first sensor device 816a, which includes components for making the actual measurements. The extension housing 818, along with extension 820 and sensor element 822 as attached, may be extended and retracted during operation of the first sensor device 816a. In some embodiments, this extension and retraction may provide an additional degree of motion independent from the Z-axis of the metrology bridge, such as where metrology bridge is rotated relative to base 202 so that sensor element 822 extends substantially parallel to base 202. This extension and retraction may be between one or more defined kinematic stops, or may be substantially continuous, in embodiments where sensor element 822 can be repeatably positioned with acceptably high accuracy.

In some embodiments, the first sensor device 816a may include an actuator that can cause the extension 820 and/or extension housing 818 to rotate while the sensor element 822 remains static, thus enabling an additional degree of motion. The first sensor device 816a may, in some embodiments, include one or more sensor elements (such as camera lens and/or laser lens) located along the extension housing 818. For example, the first sensor device 816a may include an additional capture element located along the extension 820 of the extension housing 818 (in addition or alternative to sensor element 822), as described further throughout this disclosure.

The first sensor device 816a may further include a displacement member 824. The displacement member 824 may be coupled to the first rod 804 and/or the second rod 808, and may be translated along the first rod 804 and/or the second rod 808. For example, the displacement member 824 may include one or more apertures through which the first rod 804 and/or the second rod 808 extend. The displacement member 824 may slide along the lengths of the first rod 804 and/or the second rod 808 as translated. The displacement member 824 is coupled to the first rod 804 and the second rod 808 and is translated along the first rod 804 and the second rod 808 in the illustrated embodiment.

The displacement member 824 may further include a kinematic frame 826. The extension housing 818 may be coupled to the kinematic frame 826, the displacement member 824, or some combination thereof. The kinematic frame 826 may engage with the kinematic positioning element 814 to position the extension housing 818. In particular, the kinematic frame 826 may include three contact elements to contact the kinematic positioning element 814 when engaged to position the extension housing 818. For example, the kinematic frame 826 may include a first contact element 838, a second contact element 840, and a third contact element 842 that are to contact the kinematic positioning element 814 in the illustrated embodiment. In particular, the first contact element 838 may contact the seat within the first recess 832, the second contact element 840 may contact the contact point 836, and the third contact element 842 may seat within the second recess 834, as described further throughout this disclosure.

The first sensor device 816a may include an actuation mechanism 828. The actuation mechanism 828 may be coupled to the displacement member 824. Further, the actuation mechanism 828 may engage with the first rod 804 and/or the second rod 808, and may translate the displacement member 824 along the first rod 804 and/or the second rod 808. The translation of the displacement member 824 may cause the extension housing 818 to be extended or retracted. The displacement member 824 may decouple from the kinematic frame 826 when the extension housing 818 is in an extended position, as described further throughout this disclosure.

The first sensor device 816a may further include a cable protector element 830. The cable protector element 830 is a chain-style cable protector in the illustrated embodiment. The cable protector element 830 may comprise a chain-style cable protector, a tube-style cable protector, a spiral-type cable protector, braided sleeving, fabric sleeving, heat shrink, grommets, or some combination thereof. The cable protector element 830 may be coupled to the displacement member 824 and encompass cables and/or wires of the first confocal sensor device 816a, thereby protecting the cables and/or wires from damage.

Figure 9:
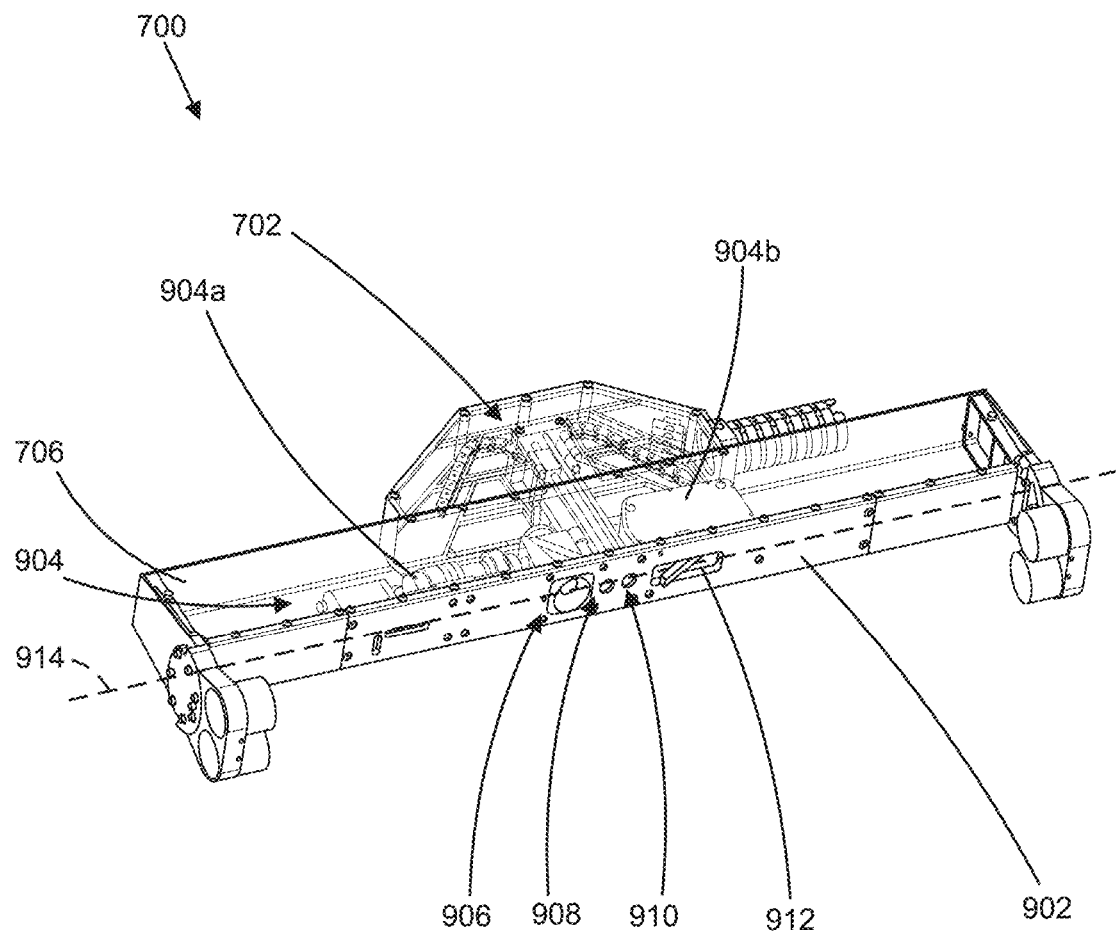
FIG. 9 illustrates a perspective view of the example metrology bridge of FIG. 7, according to various embodiments.

FIG. 9 illustrates a perspective view of the example metrology bridge 700 of FIG. 7, according to various embodiments. The metrology bridge 700 may further include a removable mounting plate 902. The removable mounting plate 902 may include one or more of the features of the removable mounting plate 118 (FIG. 1) and/or the removable mounting plate 402 (FIG. 4). The sensor assembly 702 may be mounted to the removable mounting plate 902. For example, the kinematic positioning element 814 (FIG. 8) and/or the guide 802 (FIG. 8) may be mounted to the removable mounting plate 902. One or more other sensor devices 904 may also be mounted to the removable mounting plate 902. The sensor devices 904 may include one or more of the features of the sensor devices 304 (FIG. 3), the sensor devices 502 (FIG. 5), and/or the sensor devices 602 (FIG. 6). In other embodiments, the sensor devices 904 may be omitted. As discussed above with respect to FIG. 1, the mounting plate 902 (or a similar structure) may be configured to move in some embodiments, to allow repositioning of sensor assembly 702 and/or sensor devices 904.

The removable mounting plate 902 may have a plurality of openings for the sensor assembly 702 and/or the sensor devices 904. In particular, the removable mounting plate 902 may have openings for the extension members of the sensor devices 816 (FIG. 8) and/or sensor elements of the sensor devices 904. For example, the removable mounting plate 902 has a first opening 906 corresponding to a sensor element of a first sensor device 904a, a second opening 908 corresponding to a first sensor device 816a (FIG. 8), a third opening 910 corresponding to an extension member of a second sensor device 816b, and a fourth opening 912 corresponding to a sensor element of a second sensor device 904b. The sensor element of the first sensor device 904a, the extension housing 818, the extension member of the second sensor device 816b, and the sensor element of the second sensor device 904b may be aligned along a length of the housing 706, as indicated by line 914, and may be directed out of the housing 706.

Figure 10:
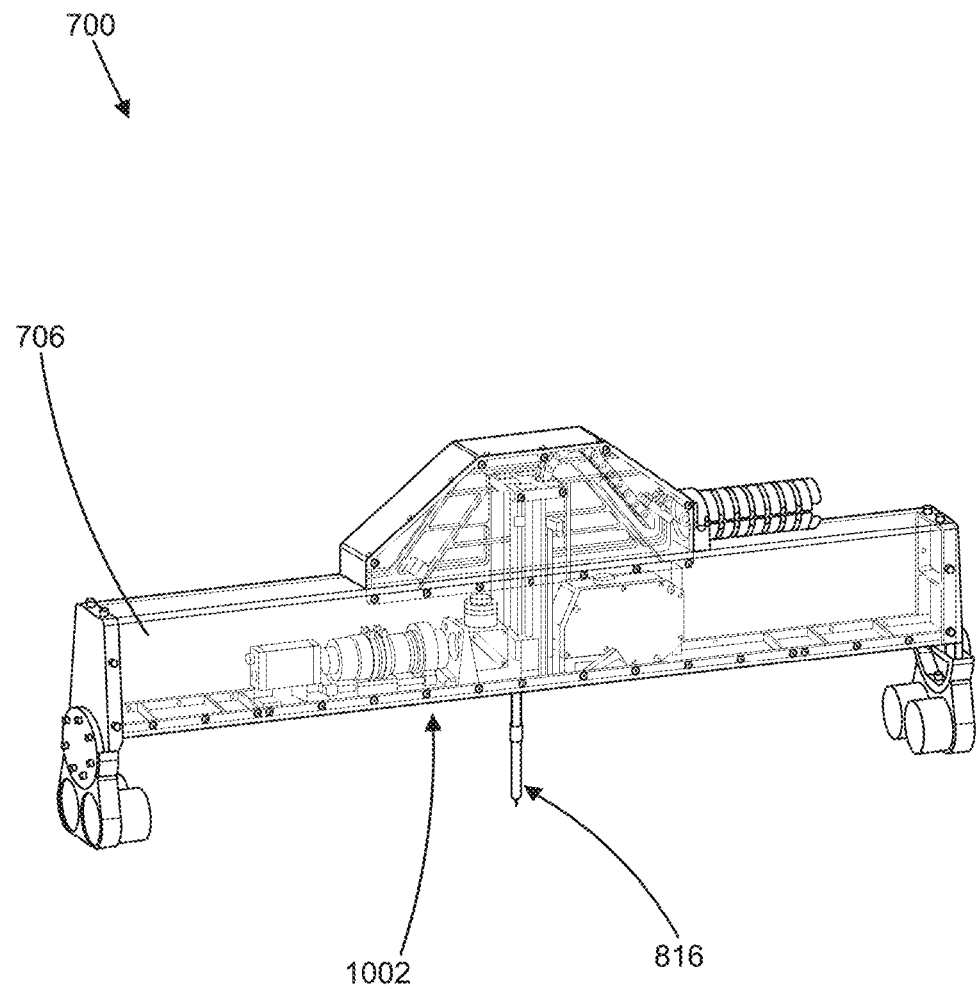
FIG. 10 illustrates the example metrology bridge of FIG. 7 with an extension member of the first confocal sensor device in an extended position, according to various embodiments.

FIG. 10 illustrates the example metrology bridge 700 of FIG. 7 with a sensor device 816 (FIG. 8) in an extended position, according to various embodiments. For example, the sensor device 816 may extended out of the housing 706 through the second opening 908 (FIG. 9) of the removable mounting plate 902 (FIG. 9). The sensor device 816 may extend along a plane that extends from the second opening 908 substantially (within 5 degrees) perpendicularly from a side 1002 of the housing 706.

Figure 11:
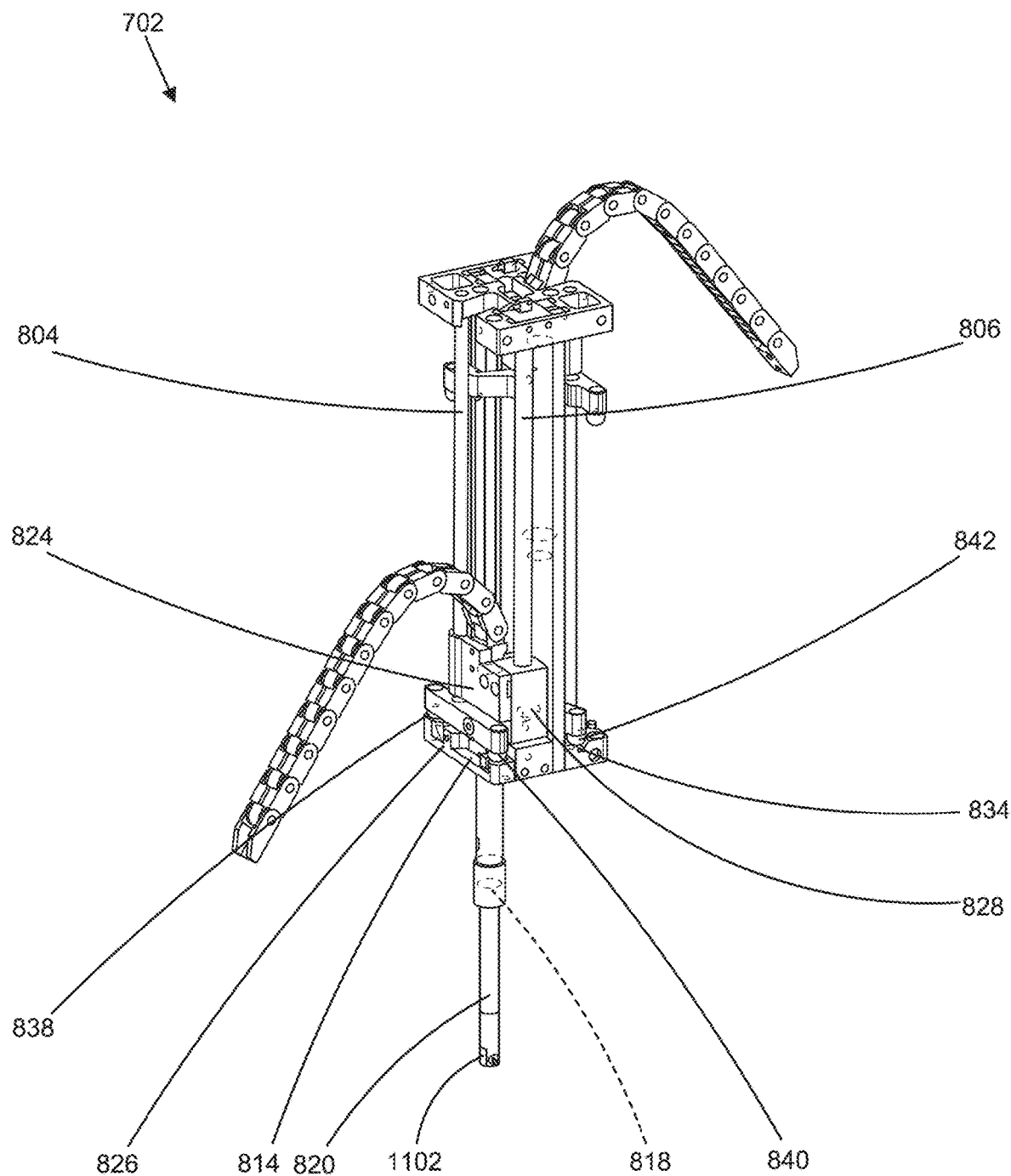
FIG. 11 illustrates the example confocal sensor assembly of FIG. 7 with the extension member in the extended position, according to various embodiments.

FIG. 11 illustrates the example sensor assembly 702 of FIG. 7 with an extension housing 818 and associated extension 820 in the extended position, according to various embodiments. The extension housing 818 may have been translated to the extended position by the actuation mechanism 808. In particular, the actuation mechanism 808 may have been translated by the displacement member 824 along the first rod 804 and the second rod 808 to cause the extension housing 818 (and by connection, the sensor tip) to translate to the extended position.

The actuation member 828 may be decoupled from the displacement member 824 when the extension housing 818 is located in the extended position. For example, the actuation member 828 may include an electromagnet, a physical element, or combination thereof that couples the actuation member 828 to the displacement member 824. The electromagnet, the physical element, or combination thereof may decouple the actuation member 828 from the displacement member 824 when the extension housing 818 is in the extended position. The electromagnet, the physical element, or combination thereof may recouple the actuation member 828 to the displacement member 824 to move the extension housing 818 out of the extended position.

When the actuation mechanism 828 is decoupled from the displacement member 824, the kinematic frame 826 may engage the kinematic positioning element 814. In particular, the kinematic frame 826 may seated at three points of the kinematic positioning element 814 when the kinematic frame 826 is engaged with the kinematic positioning element 814. For example, the first contact element 838 is seated within the first recess 832 (FIG. 8), the second contact element 840 contacts the contact point 836 (FIG. 8), and the third contact element 842 is seated within the second recess 834 in the illustrated embodiment. The kinematic frame 826 being seated at the three points of the kinematic positioning element 814 may facilitate positioning of the extension housing 818, and may improve repeatability and precision in positioning of the extension housing 818. In some embodiments, the sensor assembly 702 may further include one or more sensor devices to determine whether the kinematic frame 826 had been moved from proper engagement with the kinematic positioning element 814 and/or did not achieve proper engagement with the kinematic positioning element 814. For example, the sensor devices may determine whether the first contact element 838 is properly seated within the first recess 832, the second contact element 840 contacts the contact point 836, and/or the third contact element 842 is properly seated within the second recess 834. The combination of kinematic frame 823 and kinematic position element 814 help ensure a repeatable registration into a locked position for accurate measurements. When kinematic frame 823 and kinematic position element 814 are not engaged, some slop, movement, or other error may be permitted. In embodiments, when the sensor devices determine that the kinematic frame 823 and kinematic position element 814 are not engaged, the system 200 may be triggered to slow or stop movement of the various components (e.g. stage 203 with an object to be measured, metrology bridge 206, associated sensor devices, etc.) to prevent damage to system 200, its various components, and or the object being measured, due to undesirable contact between the object being measured and a part of system 200 (a/k/a a "crash").

The extension housing 818 may further include a capture element 1102 located along a side of the extension housing 818. The capture element 1102 may comprise a laser lens, camera lens, interferometer, or some combination thereof. The capture element 1102 may directed outwards from the extension housing 818. For example, the capture element 1102 may be directed in a different direction than the direction of extension and retraction of the extension housing 818. The extension 820 of the extension housing 818, or some portion thereof, may be rotated causing the direction to which the capture element 1102 is directed to change. For example, extension 820 of the extension housing 818 may rotate 360 degrees, thereby allowing the capture element 1102 to be rotated 360 degrees and capture data in 360 degrees.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A sensor assembly, comprising:
   a frame; and
   a contactless sensor device movably coupled to the frame, wherein the contactless sensor device is movably coupled to the frame with an actuation mechanism, the actuation mechanism configured to cause the countactless sensor device to move relative to the frame in at least one degree of motion, wherein the contactless sensor device comprises an extension and a sensor element, and an actuator which is configured to move the extension while the sensor element remains static, such that the extension moves relative to the sensor element.

2. The sensor assembly of claim 1, wherein the actuation mechanism is a first actuation mechanism of a plurality of actuation mechanisms, and wherein the contactless sensor device is movably coupled to the frame with the plurality of actuation mechanisms, each of the plurality of actuation mechanisms configured to cause the contactless sensor device to move relative to the frame in one of a plurality of degrees of motion.

3. The sensor assembly of claim 2, wherein at least one of the plurality of degrees of motion is rotational.

4. The sensor assembly of claim 2, wherein each of the plurality of degrees of motion is orthogonal from the other degrees of motion of the plurality of degrees of motion.

5. The sensor assembly of claim 2, wherein the plurality of degrees of motion comprises at least three degrees of motion that are translational, and at least three degrees of motion that are rotational.

6. The sensor assembly of claim 1, wherein the sensor element is oriented to sense at an angle relative to the at least one degree of motion.

7. The sensor assembly of claim 6, wherein the sensor element is configured to rotate about the at least one degree of motion.

8. The sensor assembly of claim 1, wherein the sensor element is oriented to sense at a variable angle relative to the at least one degree of motion.

* * * * *